W. SEIDEL.
MACHINE FOR FORMING WOODEN GEAR TEETH.
APPLICATION FILED DEC. 4, 1913.
1,108,629.
Patented Aug. 25, 1914.
3 SHEETS—SHEET 2.
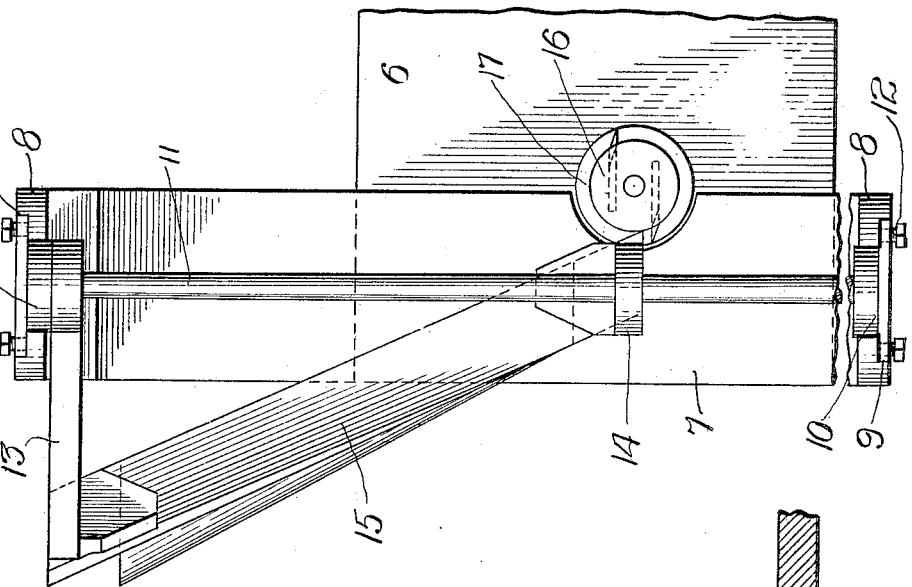
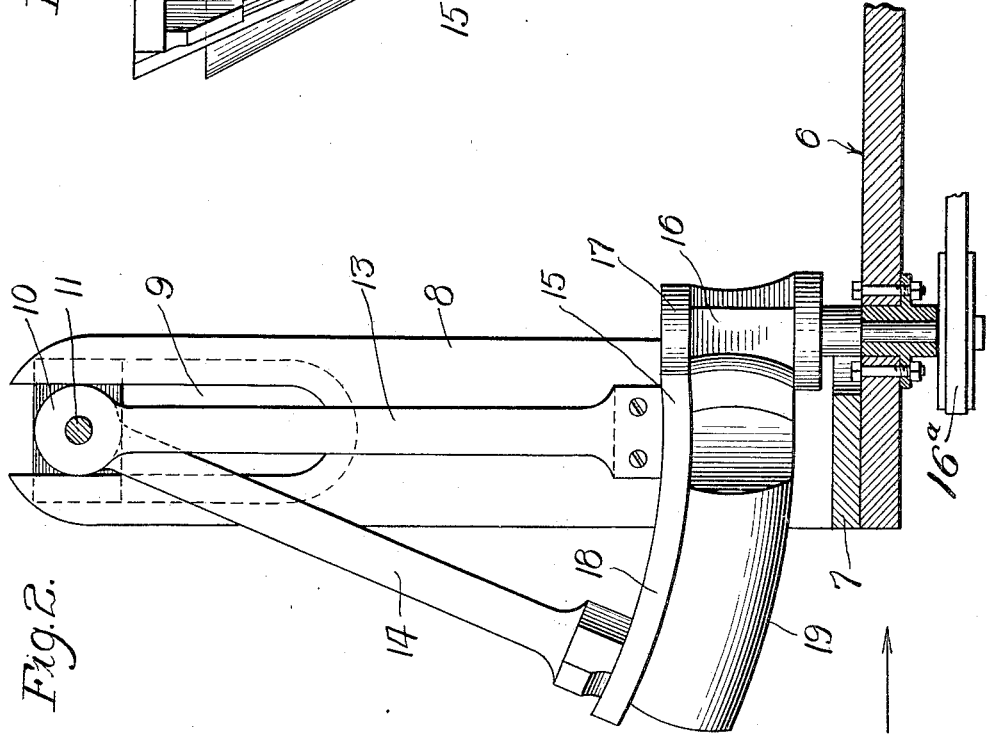
Witnesses:
Harry S. Gaither
Wm. P. Bond
Inventor
William Seidel
by Banning & Banning
Attys.

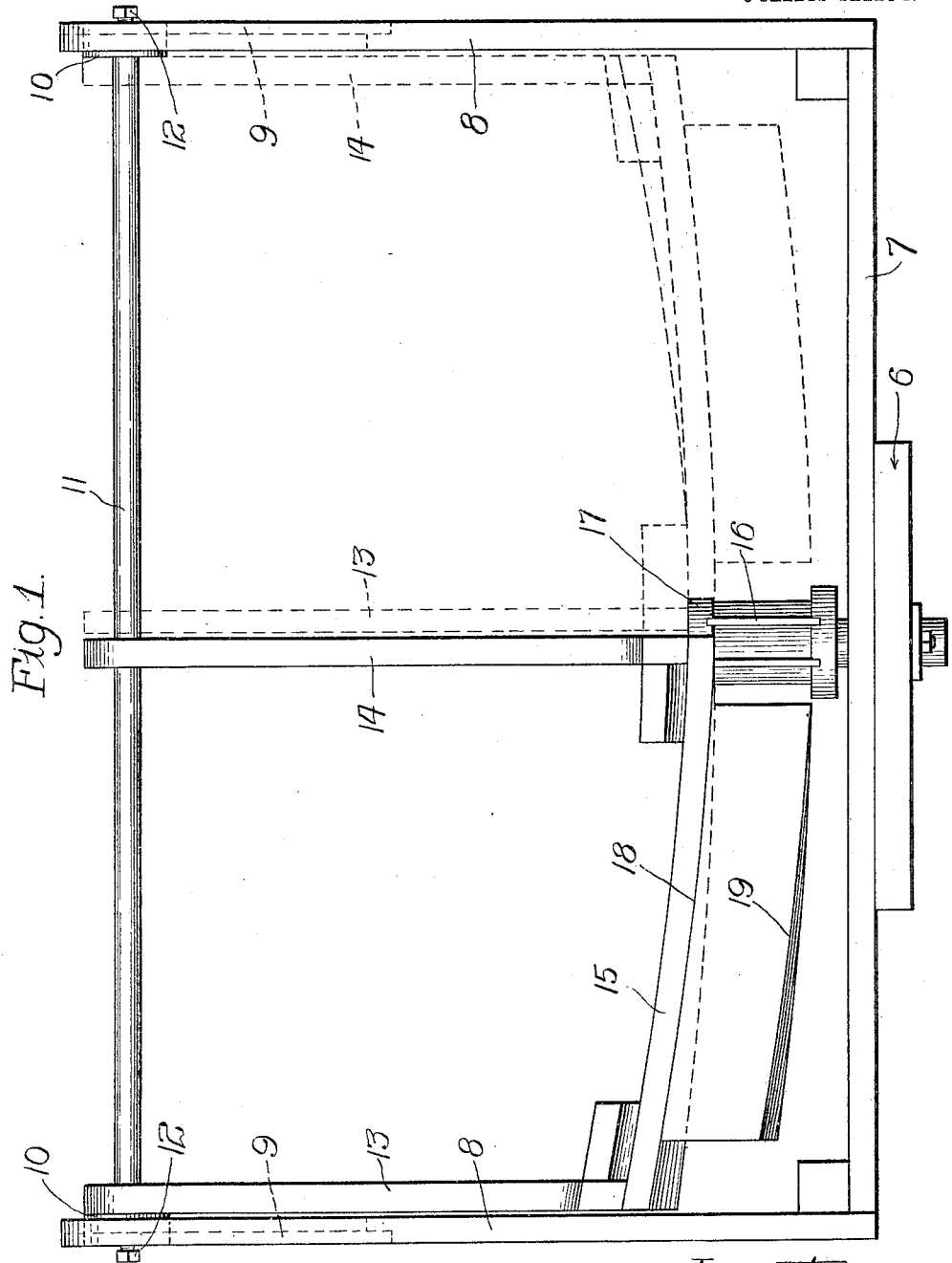

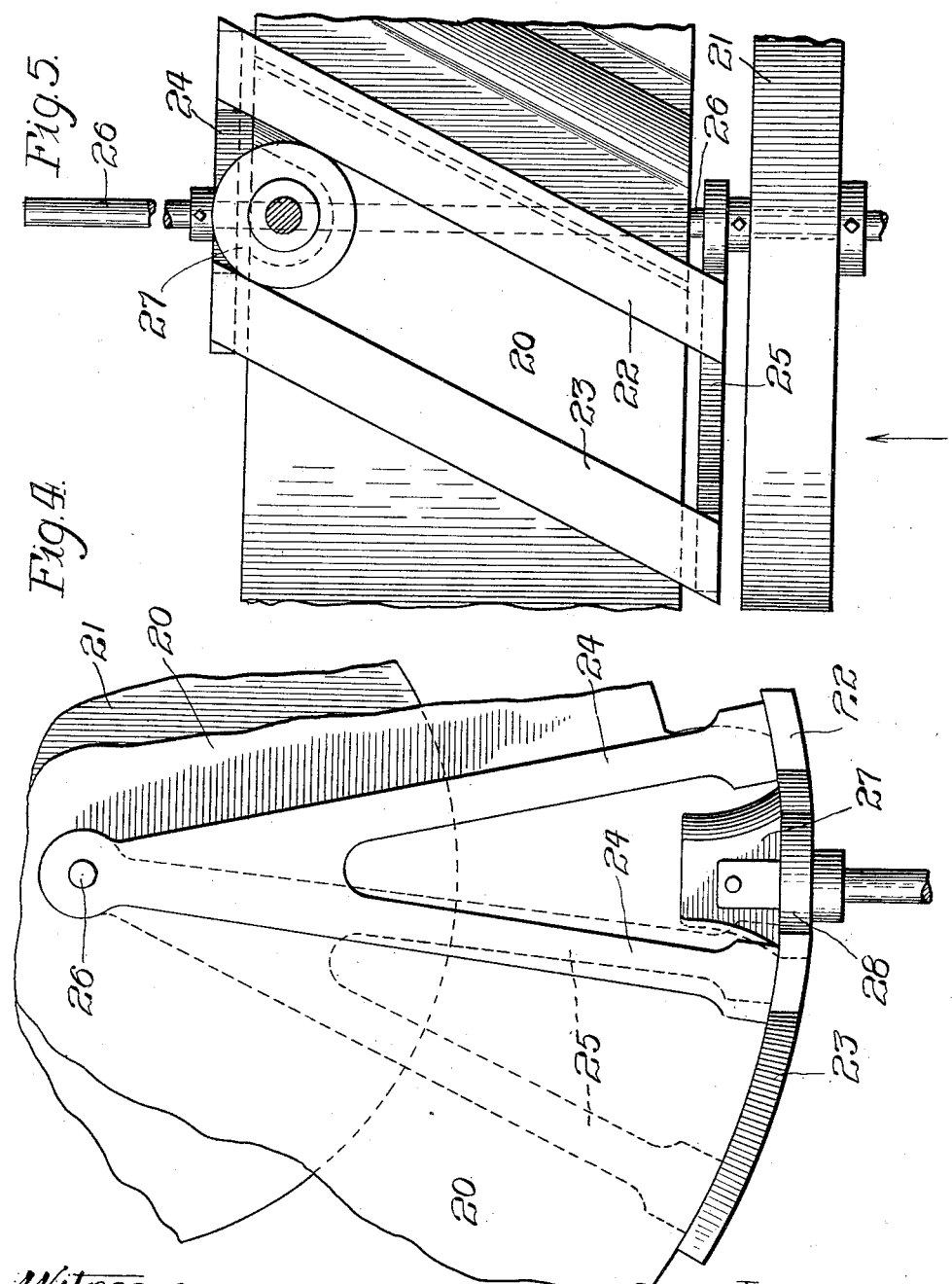

UNITED STATES PATENT OFFICE.

WILLIAM SEIDEL, OF CHICAGO, ILLINOIS, ASSIGNOR TO AMERICAN PATTERN & MODEL CO., OF CHICAGO, ILLINOIS, A CORPORATION OF ILLINOIS.

MACHNE FOR FORMING WOODEN GEAR-TEETH.

1,108,629.  Specification of Letters Patent.  Patented Aug. 25, 1914.

Application filed December 4, 1913.  Serial No. 804,724.

*To all whom it may concern:*

Be it known that I, WILLIAM SEIDEL, a citizen of the United States, residing at Chicago, in the county of Cook and State of Illinois, have invented certain new and useful Improvements in Machines for Forming Wooden Gear-Teeth, of which the following is a specification.

The present invention relates to a machine particularly arranged and adapted for use by pattern makers to cut certain kinds of gear teeth from wood.

The objects of the present invention are to provide a means whereby gear teeth of certain configuration can be easily and accurately cut in accordance with the outline of a master pattern or templet; to provide a means for supporting said templet, which can be adjusted to various heights in accordance with the size of gear being produced; and to provide a surface upon a cutter which will act as a gage against which the templet bears during the tooth forming operation.

The invention further consists in the features of construction and combination of parts hereinafter described and claimed.

In the drawings: Figure 1 is a side elevation showing the device in operative position with the work at one extreme position of movement in full lines, and at the other extreme position of movement in dotted lines; Fig. 2 is a front view of the device of the present invention; Fig. 3 is a plan view; Fig. 4 is a plan view of a form of mechanism adapted for cutting an entire gear; and Fig. 5 is an edge view of the device shown in Fig. 4.

As previously stated, the present invention relates to a machine for forming certain kinds of gear teeth from wood, and it is more particularly adapted and intended for use in forming the teeth for what is known as a skew gear. Gear teeth of this nature have a peculiar configuration, and it has been a matter of difficulty to shape the same by hand for pattern work. In the present invention, a templet or master pattern is first produced which is utilized in the cutting of the necessary number of teeth for the full gear, and thus accuracy in production is insured, as well as speed and expediency in operation.

Referring now to the drawings, and particularly to Fig. 1, the mechanism, as a whole, is mounted on any suitable form of table or support 6, and consists, as shown, of a stationary frame comprising a bottom rail 7, and side rails 8. Each of the side rails is provided with a T-shaped slot or groove 9 in its upper end, in each of which grooves rests a slidable journal 10, producing two bearings oppositely disposed, and these bearings receive the opposite ends of a horizontally extending rod or bar 11. The journals on mountings are held in the desired position within said slot through the instrumentalities of cap screws 12, or of any other suitable kind of removable locking means. Mounted to slide and turn upon the rod or bar 11 is an arm 13 and an arm 14. The arm 13 may be termed the rear arm, and the arm 14 the forward arm. Although the terms "rear" and "forward" are terms of description only, these arms constitute what may be termed the carrying means for a templet 15. Said arms are secured to the templet by any suitable means. The templet itself is configured in accordance with the configuration of the to-be-cut gear teeth, and in the construction shown is formed with a longitudinal and transverse curve, making it of a twisted formation.

As shown perhaps more clearly in Figs. 2 and 3, the arms 14 and 13 are both radially extending from the shaft 11, but are not arranged in parallelism one behind the other. That is to say, they are out of alinement. This is rendered necessary by reason of the templet lying diagonally as respects the rod or bar 11, and this angularity is necessary in order that the work may be turned to impart the necessary curve to the gear tooth, which it must possess. A shaping cutter 16 is provided which is rotated by any suitable and well-known mechanism, 16ª. This cutter is provided at its upper edge with a surface 17 which acts as a gage against which the templet 15 bears during the tooth forming operation. Now, assuming the work to be in the position shown in full lines in Fig. 1, which is at the commencement of the cutting operation, the carrier for the templet is grasped by the operator and moved with a sliding and turning movement, whereby the side of the templet is maintained in engagement with the surface 17 of the cutter. The carrier, so far as its sliding movement is concerned, will travel parallel to the rod 11, and owing to the angular relation of the templet and rod, it will be necessary to turn the carrier about the rod 11 as a center, as the work is advanced past the cutter. This is obviously necessary if the templet is to be kept in engagement with the surface 17. This turning movement will give to the completed tooth the desired curve and produce it in conformity with the configuration of the templet.

One side of a tooth, in the construction shown in Figs. 1, 2, and 3, is formed at a time, the work being first positioned to form one side of the tooth and then turned to form the other. The curve desired to be given the tooth will, of course, depend upon the pitch of each individual gear, and in certain sizes of gear, the curve will be greater than in others. The curve given to the tooth during formation is determined by the distance which the rod 11 is spaced away from the cutter 16, this rod being the center of movement about which the work is swung. Therefore, in order to adjust the device to form various sizes of gear teeth, the rod 11 is so mounted, as previously described, as to enable it to be lowered or raised as respects the cutting member, and thus the center of movement about which the work is turned during the cutting operation can be varied it is understood that in so adjusting, arms 13 and 14 of an according length must be used. The work, of course, is also curved upon its upper face 18 and lower face 19, this curve being produced by any suitable means prior to the installation of the work in the machine of the present invention. The machine of the present invention is intended to shape or form the sides of the teeth.

In Figs. 4 and 5, a somewhat modified form of device is shown, but which in no way departs from the spirit or principle shown in the structures of Figs. 1, 2, and 3. In Figs. 4 and 5, the work 20 is in the form of a complete disk, and the entire gear may be formed by the operation of this device without removing the work from place. In the form of device shown in Figs. 1, 2, and 3, a single tooth is formed at a time, and when the desired number of teeth have been produced the same are secured by suitable means onto the disk forming the body of the gear. In Figs. 4 and 5 the device cuts the tooth directly upon the work which, as stated, consists of a disk. The work is carried upon a table 21 which is raised and lowered by any suitable means, not shown, after the manner of the well-known movable drill press table. A templet 22 and a templet 23 are employed in this form of device, which are spaced apart the distance of the to-be-cut tooth. These templets are secured to carrying members 24 and 25, each of which, as shown is an arm of Y-formation. These carrying members are arranged upon a vertically extending rod or bar 26, whereby they have a turning movement about the same, and this rod, together with the carrying members and work, is intended to be raised and lowered in unison with the raising and lowering of the table 21. A cutter 27 is employed which is arranged in a horizontal plane and is rotated by any suitable means, not shown. This cutter is provided with a surface 28 against which the templets 22 and 23 bear.

As the table 21 is moved in the direction of the arrow in Fig. 5, it obviously moves the work, carrying members for the templets, and templets, and the work in this manner is fed past the cutter. The templets will form a channel with the adjacent walls thereof engaging the surface 28 of the cutter, as shown in Fig. 5, and as the work is fed by the cutter, these templets will guide the work in a manner whereby it will be given a turning movement as it advances. It is thought that this will be obvious from a study of Fig. 5, by which it will be readily understood that, as the work moves in the direction of the arrow, the templets being maintained in engagement with the surface 28 will cause a shifting or turning of the work toward the right. This will give the curve to the teeth previously referred to, in connection with the description of Figs. 1, 2 and 3. The cutter will act to form simultaneously the adjacent faces of adjacent teeth, as will be obvious by referring to Figs. 4 and 5. In this form of device, the carriers for the templets will swing about the rod 26 as a center of movement, just as the arms 13 and 14 are swung about the rod 11 in the structure of Figs. 1, 2, and 3, and the spirit and characteristics of the two forms of device are the same. After one of the cuts has been produced in the device of Figs. 4 and 5, the templets can be rearranged in proper position with respect to the next tooth to be formed, and the operation, previously described, gone through. This method of procedure is continued until the teeth are cut entirely around the periphery of the work. In the device of Figs. 4 and 5, the templets are arranged at an angle with respect to the rod 26, as will be seen in Fig. 5. In Figs. 4 and 5, it will be borne in mind that the rod 26 is extending vertically, and the cutter is extending horizontally, whereas in Figs. 1, 2, and 3, the cutter is extending vertically and the rod 11 horizontally. Aside from this feature, the devices are practically the same.

I claim:

1. In a machine of the class described, the combination of cutting means, a templet to which the work is secured, carrying means for the templet, and a mounting for said carrying means providing a center of movement on which said carrying means is permitted a simultaneous sliding and swinging movement whereby the work is carried past the cutting means and maintained in engagement therewith, substantially as described.

2. In a machine of the class described, the combination of cutting means, a templet to which the work is secured, carrying means for the templet, a mounting for said carrying means providing a center of movement on which said carrying means is permitted a simultaneous sliding and swinging movement whereby the work is carried past the cutting means and maintained in engagement therewith, and means permitting adjustment of said mounting toward and from said cutting means, substantially as described.

3. In a machine of the class described, the combination of cutting means, a templet to which the work is secured, carrying means for the templet, a mounting for said carrying means providing a center of movement on which said carrying means is permitted a simultaneous sliding and swinging movement whereby the work is carried past the cutting means and maintained in engagement therewith, and a surface upon said cutting means serving as a gage against which the templet engages, substantially as described.

4. In a machine of the class described, the combination of cutting means, a templet to which the work is secured, carrying means for the templet, and a mounting on which the carrying means is permitted a simultaneous sliding and rotary movement, said templet extending below said mounting and diagonally disposed thereto, substantially as described.

5. In a machine of the class described, the combination of cutting means, a templet to which the work is secured, carrying means for the templet, a mounting on which the carrying means is permitted a simultaneous sliding and rotary movement, templet extending below said mounting and diagonally disposed thereto, and means permitting adjustment of said mounting toward and from said cutting means, substantially as described.

6. In a machine of the class described, the combination of cutting means, a templet to which the work is secured, arms secured to the templet, and a rod upon which said arms are arranged to slide and turn, said arms extending radially from said rod, but out of alinement one with the other, said templet extending below said rod and diagonally thereto, substantially as described.

7. In a machine of the class described, the combination of cutting means, a templet to which the work is secured, arms secured to the templet, a rod upon which said arms are arranged to slide and turn, said arms extending radially from said rod, but out of alinement one with the other, said templet extending below said rod and diagonally thereto, and means for adjusting said rod toward and from said cutting means, substantially as described.

WILLIAM SEIDEL.

Witnesses:
  WM. P. BOND,
  THOMAS A. BANNING, Jr.

---

Copies of this patent may be obtained for five cents each, by addressing the "Commissioner of Patents. Washington, D. C."